Patented Nov. 28, 1922.

1,437,170

UNITED STATES PATENT OFFICE.

CYRENIUS WALTER CROCKETT, OF PASSAIC, NEW JERSEY, ASSIGNOR TO THE ALCO DEO COMPANY, OF WALLINGTON, NEW JERSEY, A CORPORATION OF NEW JERSEY.

ORGANIC COMPOSITION.

No Drawing. Application filed July 13, 1922. Serial No. 574,854.

*To all whom it may concern:*

Be it known that I, CYRENIUS WALTER CROCKETT, a citizen of the United States of America, residing at Passaic, New Jersey, have invented a new and useful Organic Composition, of which the following is a specification.

My invention relates to organic compositions used for instance as lacquers, varnishes and the like.

The main object is to provide a composition which can be made economically, which can be readily applied, and which will be durable.

I have discovered that mesityl oxide has the property of serving as a solvent for nitrocellulose, and other substances with or without other liquids. Mesityl oxide has a boiling point of about 130° C., and it dissolves nitrocellulose rapidly at ordinary temperatures producing solutions which are easy to manipulate and which dry to transparent films. Mesityl oxide also dissolves many of the gums and resins used in the varnish and lacquer trade, such as shellac, mastic, resins, copals, so that these substances may also be incorporated in various compositions. I have found that the use of mesityl oxide produces desirable results not only where high boiling solvents are necessary, but in compositions where low boiling solvents are desirable.

In order to produce the best results from the standpoint of manufacture and use, it is desirable to dilute the mesityl oxide with other liquids such as ethyl acetate and benzol. In some cases I prefer also to use some butyl alcohol or fusel oil, or denatured alcohol.

As an example of one composition embodying my invention, I may dissolve approximately 8 ozs. of nitrocellulose in one gallon of a solvent consisting of 45% mesityl oxide, 15% ethyl acetate, 20% of benzol, and 20% of butyl alcohol. A gum solution may be added if desired. Such a composition constitutes an excellent lacquer for metal surfaces. It evaporates slowly and gives a film which lies rather flat and yet which is tough and transparent, and which does not rainbow.

A similar composition may be used for coating patent leather, but in this case, I prefer to substitute fusel oil for the butyl alcohol and may decrease the benzol to 15% and increase the fusel oil to 25%. For leather work, I also prefer to add a quantity of boiled linseed oil to the solution together with colors to produce the finish desired.

For colored enameled lacquers a considerably greater quantity of nitrocellulose, say from 12 to 16 oz. per gallon may be dissolved in the solvent, and in this case the solvent may contain say 40% of mesityl oxide, 18% ethyl acetate, 32% of benzol, and 10% of butyl alcohol. To this solution may be added the colors and pigments ground in the proper manner to give the desired finish to the material on which the lacquer is to be applied.

For waterproofing and surfacing artificial and split leathers, I would suggest from 8 to 12 oz. nitrocellulose per gallon of solvent, the solvent to contain say 8% of mesityl oxide, 35% of ethyl acetate, 32% of benzol, and 25% of alcohol. To this solution oil and colors to produce the kind of finish required may be added, such as processed castor oil or blown rapeseed oil.

For a bronzing liquid, I would suggest from 4 to 6 oz. of nitrocellulose per gallon of solvent. In this case a solvent may contain 10% of mesityl oxide, 35% of ethyl acetate and 55% of benzol. To this solution may be added the required amount of bronze powder or the like, together with sufficient quantities of gum solutions to give the desired coating.

It should be understood that the proportions of the various ingredients may be altered and that substitutes may be made for some of the ingredients for various purposes. An increase in the quantity of the nitrocellulose increases the thickness of the film, and a decrease in the quantity of course decreases the thickness of the film. For certain purposes a thick film is desirable, but if it is too thick it will not lay down properly and gives a poor appearance. If the film is too thin the work is not properly covered.

Mesityl oxide enables the composition to be spread evenly and makes the film transparent, tough and flexible. Ethyl acetate aids the solution and is inexpensive. Butyl alcohol prevents the film from blushing and combines advantageously with ethyl acetate. Benzol acts as a diluent to cheapen the cost and to a certain extent prevents blushing.

An excess of benzol causes precipitation. Alcohol acts as a deodorizer for benzol and has a certain softening effect on the finish. Where boiled linseed oil is used fusel oil is desirable as it prevents blushing and tends to keep the linseed oil in solution and assists in spreading. The amount of diluent which can be added to a given composition is governed by the kind of work for which the composition is made. In some cases substitutes for benzol can be used, such as toluol, xylol, solvent naphtha and petroleum products. In some cases substitutes may be employed for ethyl acetate, such as ketones, wood alcohol, acetone, methyl acetone, methyl acetate, and what is known to the trade as acetone oils. In metal and in patent leather lacquers, benzol or benzol substitutes may partially or wholly replace the ethyl acetate.

It should be understood of course in referring to mesityl oxide, I have reference to the commercial product which may be made for instance from diacetone alcohol which frequently contains or is accompanied by acetone. It has been found that mesityl oxide can be substituted with satisfactory results in lacquers where high boiling solvents are necessary as basic solvents for amyl acetate and butyl acetate. In lacquers where low boiling solvents such as ethyl acetates are used as basic solvents mesityl oxide can be used in place of esters and alcohols to retard evaporation, prevent blushing, and enable the lacquer to spread properly.

I claim:

1. A composition of the character described, comprising nitrocellulose dissolved in a solution containing mesityl oxide.

2. A coating composition comprising a solution of nitrocellulose in mesityl oxide and another miscible liquid hyrocarbon.

3. A composition comprising nitrocellulose dissolved in a solution of mesityl oxide, ethyl acetate and benzol.

4. A composition comprising a soluble lacquer-forming base dissolved in mesityl oxide, ethyl acetate and a diluent.

5. A composition comprising a soluble lacquer-forming hydrocarbon base dissolved in a solution of mesityl oxide, another solvent and a diluent.

6. A composition comprising nitrocellulose dissolved in a solution of mesityl oxide and benzol.

7. A composition comprising nitrocellulose dissolved in a solution of mesityl oxide, ethyl acetate and benzol, and containing a gum.

8. A composition comprising nitrocellulose dissolved in a solution of mesityl oxide and ethyl acetate.

9. A composition comprising nitrocellulose dissolved in a solution of mesityl oxide and containing gum.

10. A coating composition of the character described comprising a soluble lacquer-forming organic compound dissolved in a solution containing at least five percent of mesityl oxide.

11. A coating composition comprising a solution of a soluble lacquer-forming organic compound in mesityl oxide and another miscible hydrocarbon liquid.

12. A coating composition comprising a soluble lacquer-forming hydrocarbon base dissolved in a solvent containing approximately forty-five percent of mesityl oxide.

13. A coating composition of the character described comprising a soluble lacquer-forming hydrocarbon base dissolved in a solution containing mesityl oxide and benzol.

14. A coating composition comprising a soluble lacquer-forming hydrocarbon base dissolved in a solution containing mesityl oxide and acetate, benzol and a gum.

15. A coating composition comprising a soluble lacquer-forming hydrocarbon base dissolved in a solution containing mesityl oxide and ethyl acetate.

16. A coating composition comprising a soluble lacquer-forming hydrocarbon base dissolved in a solution containing mesityl oxide and a gum.

CYRENIUS WALTER CROCKETT.